(12) United States Patent
Cao et al.

(10) Patent No.: US 11,929,614 B2
(45) Date of Patent: Mar. 12, 2024

(54) ENERGY STORAGE SYSTEM AND SWITCHING POWER SUPPLY THEREOF

(71) Applicant: Sungrow Power Supply Co., Ltd., Hefei (CN)

(72) Inventors: Wei Cao, Hefei (CN); Ri Fang, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 204 days.

(21) Appl. No.: 17/562,068

(22) Filed: Dec. 27, 2021

(65) Prior Publication Data

US 2022/0271532 A1 Aug. 25, 2022

(30) Foreign Application Priority Data

Feb. 20, 2021 (CN) .......................... 202110192388.X

(51) Int. Cl.
*H02J 3/00* (2006.01)
*H02J 3/32* (2006.01)
(Continued)

(52) U.S. Cl.
CPC ................ *H02J 3/007* (2020.01); *H02J 3/32* (2013.01); *H02J 3/381* (2013.01); *H02J 9/005* (2013.01); *H02J 9/061* (2013.01); *H02M 7/04* (2013.01)

(58) Field of Classification Search
CPC .... H02J 3/007; H02J 3/32; H02J 3/381; H02J 9/005; H02J 9/061; H02J 2207/10; H02J 2300/24; H02J 1/084; H02J 3/0073; H02M 7/04; Y02E 10/56

USPC ......................................................... 307/68
See application file for complete search history.

(56) References Cited

U.S. PATENT DOCUMENTS

2001/0033502 A1  10/2001 Blair et al.
2009/0236916 A1   9/2009 Nishimura
(Continued)

FOREIGN PATENT DOCUMENTS

CN    200950639 Y    9/2007
CN    102769335 A   11/2012
(Continued)

OTHER PUBLICATIONS

Extended European Search Report for European Application No. 21217307.4, dated Jul. 5, 2022.
(Continued)

*Primary Examiner* — Richard Tan
(74) *Attorney, Agent, or Firm* — Wolf, Greenfield & Sacks, P.C.

(57) ABSTRACT

An energy storage system and a switching power supply thereof are provided in the present disclosure. An alternating current AC input terminal of the switching power supply is connected to an AC power source via a protection fuse unit. A direct current DC input terminal of the switching power supply is connected to an energy storage unit in the energy storage system via a protection fuse unit. An output terminal of the switching power supply is connected to a master control unit in the energy storage system and an additional load in the energy storage system. Therefore, the switching power supply can receive electric energy from at least one of the energy storage unit and the AC power source, and supply power to the master control unit and the additional load in the energy storage system.

18 Claims, 7 Drawing Sheets

(51) Int. Cl.
    *H02J 3/38*     (2006.01)
    *H02J 9/00*     (2006.01)
    *H02J 9/06*     (2006.01)
    *H02M 7/04*     (2006.01)

(56) References Cited

U.S. PATENT DOCUMENTS

| | | | |
|---|---|---|---|
| 2019/0117919 A1* | 4/2019 | Panarello | H02J 7/0068 |
| 2022/0239143 A1* | 7/2022 | Nagabhushanrao | H02J 9/062 |

FOREIGN PATENT DOCUMENTS

| | | |
|---|---|---|
| CN | 205644183 U | 10/2016 |
| CN | 108365658 A | 8/2018 |
| CN | 110518690 A | 11/2019 |
| CN | 111355281 A | 6/2020 |
| CN | 210693486 U | 6/2020 |
| EP | 1 478 072 A2 | 11/2004 |
| JP | 2012-1752301 A | 9/2012 |
| KR | 2001-0011895 A | 2/2001 |
| WO | WO 2019/073652 A1 | 4/2019 |
| WO | WO 2020/176915 A1 | 9/2020 |

OTHER PUBLICATIONS

Chinese First Office Action dated Jul. 15, 2023 for Chinese Application No. CN 202110192388.X.

Zhou et al., Implementation of Standby Power Control Technology with Zero Power Consumption. TV Engineering. Apr. 30, 2005;4:33-35, 38.

\* cited by examiner

ENERGY STORAGE SYSTEM AND SWITCHING POWER SUPPLY THEREOF

This application claims the priority to Chinese Patent Application No. 202110192388.X, titled "ENERGY STORAGE SYSTEM AND SWITCHING POWER SUPPLY THEREOF", filed on Feb. 20, 2021 with the Chinese Patent Office, which is incorporated herein by reference in its entirety.

FIELD

The present disclosure relates to the technical field of energy storage and power supply, and in particular to an energy storage system and a switching power supply for the energy storage system.

BACKGROUND

FIG. 1 is a block diagram showing power supply for an energy storage system, including a three-phase power input (such as phase a, phase b and phase c as shown in FIG. 1), protection fuses (such as Fuse1ac and Fuse2ac as shown in FIG. 1), a manual switch SWac, an uninterruptible power system (UPS), a switching power supply, and the like. The UPS is usually equipped in a power supply system of the energy storage system to ensure a high reliability of power supply to the energy storage system. When a power grid is cut off, that is, when the three-phase power input is cut off, the UPS can maintain the power supply of the system for a period of time, for example, to applications such as off-grid start and black start. The duration of such power supply depends on a battery capacity of the UPS.

However, a lead-acid battery in the UPS has a service life of about two years, and therefore needs to be maintained every two years. The service life may be even shorter due to a harsh environment of the energy storage system.

SUMMARY

In view of the above, an objective of the present disclosure is to provide an energy storage system and a switching power supply for the energy storage system, in order to reduce power consumption of the energy storage system during standby, reduce cost for using the energy storage system, extend a service life of the switching power supply of the energy storage system, and improve a reliability of power supply in the energy storage system.

According to a first aspect of the present disclosure, a switching power supply for an energy storage system is provided. An alternating current (AC) input terminal of the switching power supply is connected to an AC power source via a first protection fuse unit; a direct current (DC) input terminal of the switching power supply is connected to an energy storage unit in the energy storage system via a second protection fuse unit; and an output terminal of the switching power supply is connected to a power supply terminal of a master control unit in the energy storage system and a power supply terminal of an additional load in the energy storage system. The switching power supply is configured to: receive electric energy from at least one of the energy storage unit and the AC power source, and supply power to the master control unit and the additional load in the energy storage system; and switch, when the energy storage system enters a standby state, to a low-power-consumption standby mode to supply power at most to the master control unit.

In an embodiment, in the low-power-consumption standby mode, the switching power supply is configured to supply power only to the master control unit under a control of the master control unit, or stop supplying power to both the master control unit and the additional load under a control of an external controller.

In an embodiment, the switching power supply includes a rectifier module and a DC/DC power supply unit. An AC side of the rectifier module serves as the AC input terminal of the switching power supply. A DC side of the rectifier module is connected to a first side of the DC/DC power supply unit via a DC bus. The DC bus is further connected to the DC input terminal of the switching power supply. A second side of the DC/DC power supply unit serves as the output terminal of the switching power supply.

In an embodiment, the DC bus is connected to one or more battery clusters in the energy storage unit via one or more DC input terminals of the switching power supply.

In an embodiment, the switching power supply further includes one or more diode transmission module. The number N of the diode transmission modules is equal to the number of the battery clusters connected to the DC bus via the one or more DC input terminals. The battery clusters are each connected in serial to one of the diode transmission modules, and then connected in parallel to the DC bus, so that at any time only one of the batter clusters, who has the highest voltage, outputs power.

In an embodiment, the output terminal of the switching power supply includes a first output terminal for supplying power to the master control unit, and a second output terminal for supplying power to the additional load.

In an embodiment, the DC/DC power supply unit includes a first DC/DC power supply and a first controllable switching unit. A first side of the first DC/DC power supply is connected to the DC bus. An end on a second side of the first DC/DC power supply serves as the first output terminal of the switching power supply, and another end on the second side of the first DC/DC power supply is connected to the second output terminal of the switching power supply via the first controllable switching unit.

In an embodiment, the first controllable switching unit is controlled by the master control unit.

In an embodiment, the DC/DC power supply unit includes a first controllable switching unit, a first DC/DC power supply, and a second DC/DC power supply. A first side of the first DC/DC power supply is connected to the DC bus. A first side of the second DC/DC power supply is connected to the DC bus via the first controllable switching unit. A second side of the first DC/DC power supply serves as the first output terminal of the switching power supply. A second side of the second DC/DC power supply serves as the second output terminal of the switching power supply.

In an embodiment, the first controllable switching unit is controlled by the master control unit.

In an embodiment, the switching power supply further includes a second controllable switching unit and a low-power-consumption wakeup unit. The second controllable switching unit is arranged between the first side of the DC/DC power supply unit and the DC bus. The low-power-consumption wakeup unit is configured to receive a control signal from an external controller, and control an on/off state of the second controllable switching unit in response to the control signal, to turn off the second controllable switching unit when the energy storage system enters the standby state.

In an embodiment, the low-power-consumption wakeup unit includes a first voltage dividing and stabilizing branch, a second voltage dividing and stabilizing branch, a switching unit, an optical coupler, and a driving unit. A first side of the first voltage dividing and stabilizing branch and a first side of the second voltage dividing and stabilizing branch are both connected to the DC bus. A positive electrode on a second side of the first voltage dividing and stabilizing branch is connected to an end of the switching unit. A negative electrode on the second side of the first voltage dividing and stabilizing branch is connected to another end of the switching unit via a light-emitting side of the optical coupler. The switching unit is turned on when the energy storage system enters the standby state. A light-receiving side of the optical coupler is arranged between two ends of a second side of the second voltage dividing and stabilizing branch. A first side of the driving unit is connected to both ends on the light-receiving side of the optical coupler. A second side of the driving unit is configured to drive the second controllable switching unit.

In an embodiment, the first voltage dividing and stabilizing branch includes a first resistor, a second resistor, a third resistor, a fourth resistor, a first voltage stabilizing diode, and a first capacitor. An end of the first resistor is connected to a positive electrode of the DC bus. Another end of the first resistor is connected to an end of the second resistor and an end of the third resistor. Another end of the third resistor is connected to a cathode of the first voltage stabilizing diode, an end of the fourth resistor, and an end of the first capacitor. Another end of the fourth resistor serves as the negative electrode on the second side of the first voltage dividing and stabilizing branch. A negative electrode of the DC bus, another end of the second resistor, an anode of the first voltage stabilizing diode, and another end of the first capacitor are connected at a point serving as the positive electrode on the second side of the first voltage dividing and stabilizing branch.

In an embodiment, the second voltage dividing and stabilizing branch includes a fifth resistor, a sixth resistor, a seventh resistor, an eighth resistor, and a second voltage stabilizing diode, and a second capacitor. An end of the fifth resistor is connected to a positive electrode of the DC bus. Another end of the fifth resistor is connected to an end of the sixth resistor and an end of the seventh resistor. Another end of the seventh resistor is connected to a cathode of the second voltage stabilizing diode, an end of the eighth resistor, and an end of the second capacitor. Another end of the eighth resistor serves as a positive electrode on the second side of the second voltage dividing and stabilizing branch. A negative electrode of the DC bus, an end on the first side of the driving unit, another end of the sixth resistor, an anode of the second voltage stabilizing diode, and another end of the second capacitor are connected at a point serving as a negative electrode on the second side of the second voltage dividing and stabilizing branch.

According to a second aspect of the present disclosure, an energy storage system is provided, including an energy storage unit, a master control unit, a power converter, and the switching power supply according to any one of the embodiments in the first aspect of the present disclosure. The energy storage unit is connected to an external device via the power converter. The energy storage unit and the power converter are both communicatively connected to the master control unit. The switching power supply is configured to provide auxiliary power supply.

In an embodiment, the energy storage unit includes one or more battery clusters. The battery clusters are connected in parallel to a side of the power converter, and another side of the power converter is connected to the external device.

In an embodiment, in a case where the external device is a transformer connected to a power grid, the power converter is a power conversion system (PCS); and in a case where the external device is a photovoltaic grid-connected system, the power converter is a bidirectional DC/DC converter connected to a DC bus of an inverter in the photovoltaic grid-connected system.

In an embodiment, a first manual switching unit is provided between the switching power supply and the first protection fuse unit, and is configured to control an on/off state between the switching power supply and the AC power source. A second manual switching unit is provided between the switching power supply and the second protection fuse unit, and is configured to control an on/off state between the switching power supply and the energy storage unit.

As known from the mentioned technical solutions, a switching power supply for an energy storage system is provided in the present disclosure. An alternating current (AC) input terminal of the switching power supply is connected to an AC power source via a protection fuse unit. A direct current DC input terminal of the switching power supply is connected to an energy storage unit in the energy storage system via a protection fuse unit. An output terminal of the switching power supply is connected to a master control unit in the energy storage system and an additional load in the energy storage system. Therefore, the switching power supply can receive electric energy from at least one of the energy storage unit and the AC power source, and supply power to the master control unit and the additional load in the energy storage system. In other words, the energy storage unit is substituted for the uninterruptible power supply in the conventional technology, which can reduce cost for using the energy storage system, extend a service life of the switching power supply for the energy storage system, and improve a reliability of power supply in the energy storage system. In addition, when the energy storage system is in standby, the switching power supply in the present disclosure can work in a low-power-consumption standby mode and supply power to only the master control unit, which can reduce power consumption of the energy storage system during standby, and extend the standby time of the energy storage system.

BRIEF DESCRIPTION OF THE DRAWINGS

In order for a clearer illustration of technical solutions in embodiments of the present disclosure or the conventional technology, drawings used in the description of the embodiments or the conventional technology are described briefly hereinafter. Apparently, the drawings described in the following illustrate only some embodiments of the present disclosure, and other drawings may be obtained by those ordinarily skilled in the art based on these drawings without any creative effort.

DETAILED DESCRIPTION

In order to make the objective, technical solutions and advantages of the embodiments of the present disclosure clearer, the technical solutions in the embodiments of the present disclosure are described clearly and completely in conjunction with the drawings of the embodiments of the disclosure hereinafter. It is apparent that the described embodiments are only some rather than all embodiments of the present disclosure. Any other embodiments obtained by those skilled in the art based on the embodiments in the present disclosure without any creative effort shall fall within the protection scope of the present disclosure.

In this specification, terms "comprise". "include", or any other variants thereof are intended to encompass a non-exclusive inclusion, such that the process, method, article, or device including a series of elements includes not only those elements but also other elements that are not explicitly listed, or the elements that are inherent to such process, method, article, or device. Unless expressively limited otherwise, a process, method, article or device limited by "comprising/including a(n) . . . " does not exclude existence of another identical element in such process, method, article or device.

A switching power supply for an energy storage system is provided according to an embodiment of the present disclosure, in order to solve the problem in the conventional technology caused by the use of UPS in the energy storage system. A lead-acid battery in an UPS for providing auxiliary power supply for an energy storage system has a service life of about two years, and therefore needs to be maintained every two years. The service life may be even shorter due to a harsh environment of the energy storage system.

Figure 8:
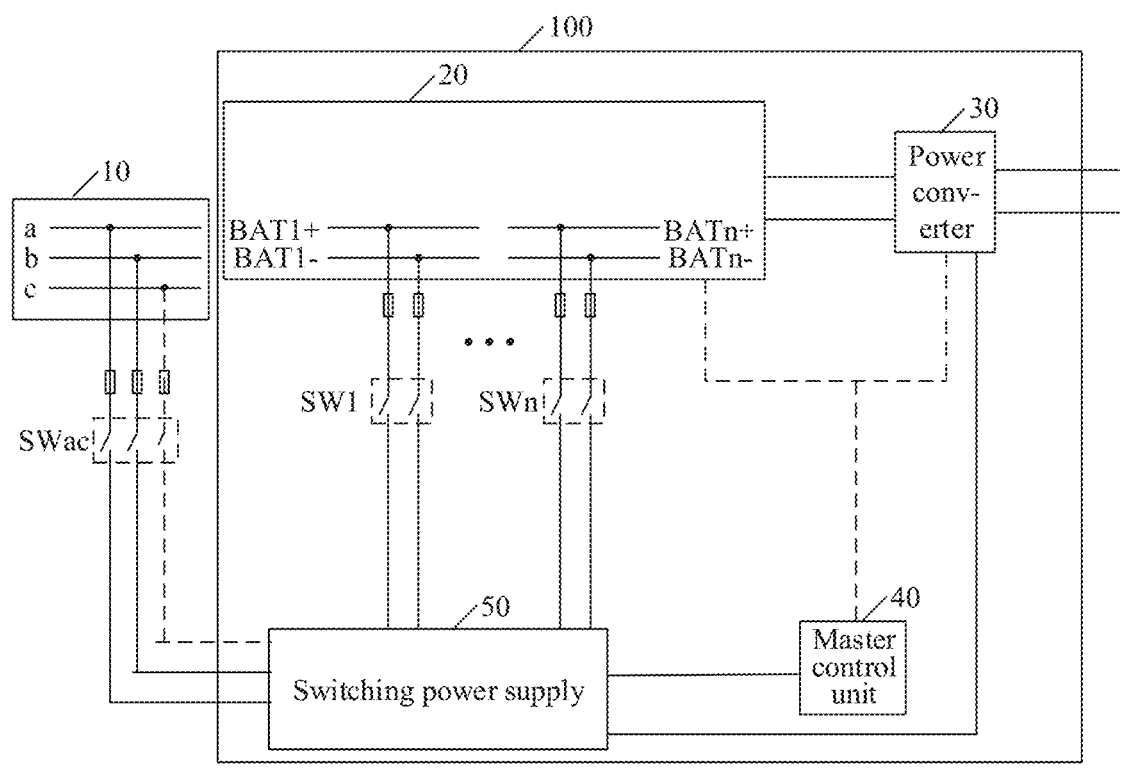
FIG. 8 is a schematic diagram of an energy storage system according to an embodiment of the present disclosure.

Referring to FIG. 8, a specific connection of the switching power supply 50 is described below.

Figure 3:
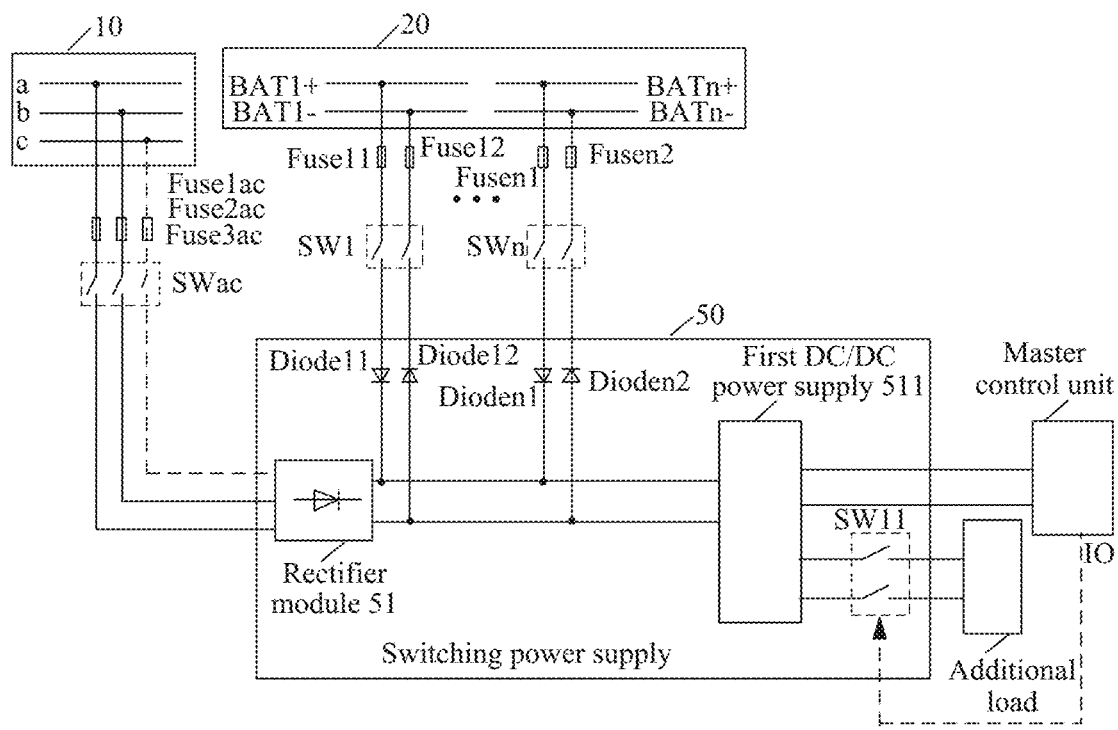
FIG. 3 is a schematic diagram of a switching power supply for an energy storage system according to an embodiment of the present disclosure.

An alternating current (AC) input terminal of the switching power supply 50 is connected to an AC power source 10 via a protection fuse unit (such as Fuse1ac, Fuse2ac and Fuse3ac as shown in FIG. 3), in order to receive electric energy from the AC power source 10. In some embodiments, the AC input terminal of the switching power supply 50 is connected to an end of the protection fuse unit, and another end of the protection fuse unit is connected to a phase of the AC power source 10. The AC power source 10 may be a single-phase AC power source, or a multi (three)-phase AC power source, such as an urban electricity supply. The type of the AC power source 10 depends on an actual situation and is not specifically limited herein, which shall all be within the protection scope of the present disclosure.

A direct current (DC) input terminal of the switching power supply 50 is connected to an energy storage unit 20 in the energy storage system via a protection fuse units (such as Fuse11, Fuse12, . . . , Fusen1 and Fusen2 as shown in FIG. 3), in order to receive electric energy from the energy storage unit 20. In some embodiments, the DC input terminal of the switching power supply 50 is connected to an end of the protection fuse unit, and another end of the protection fuse unit is connected to an electrode of the energy storage unit 20.

The output terminal of the switching power supply 50 is connected to a power supply terminal of a master control unit in the energy storage system and a power supply terminal of an additional load such as a drive circuit in the energy storage system to provide auxiliary power supply. In this way, the switching power supply 50 can supply power to the master control unit and the additional load. The additional load is any load other than the master control unit in the energy storage system.

In other words, the switching power supply 50 is configured to receive electric energy from at least one of the energy storage unit 20 and the AC power source 10 to supply power to the master control unit and the additional load. Preferably, the switching power supply 50 is configured to receive electric energy at any time from only one of the AC power source 10 and the energy storage unit 20 who has the higher voltage. The switching power supply 50 may provide auxiliary power supply by receiving electric energy from only the energy storage unit 20, or only the AC power source 10, or both the energy storage unit 20 and the AC power source 10.

In the embodiments, the energy storage unit 20 is substituted for an uninterruptible power supply in the conventional technology, which can reduce cost for using the energy storage system, extend a service life of the switching power supply 50 for the energy storage is a three-phase AC power source 10. A first terminal of the AC side of the rectifier module 51 is connected to phase A cable of the AC power source 10 via a first protection fuse Fuse1ac, a second terminal of the AC side of the rectifier module 51 is connected to phase B cable of the AC power source 10 via a second protection fuse Fuse2ac, and a third terminal of the AC side of the rectifier module 51 is connected to phase C cable of the AC power source 10 via a third protection fuse Fuse3ac (as shown in FIG. 3 to FIG. 6).

A DC side of the rectifier module 51 is connected to a first side of the DC/DC power supply unit 52 via a DC bus.

In some embodiments, a positive electrode on the DC side of the rectifier module 51 is connected to a positive electrode of the DC bus, and a negative electrode on the DC side of the rectifier module 51 is connected to a negative electrode of the DC bus. The positive electrode of the DC bus is connected to a positive electrode on a first side of the DC/DC power supply unit 52, and the negative electrode of the DC bus is connected to a negative electrode on the first side of the DC/DC power supply unit 52.

The DC bus is further connected to the DC input terminal of the switching power supply 50. In some embodiments, the positive electrode of the DC bus is connected to the positive electrode of the DC input terminal of the switching power supply 50, and the negative electrode of the DC bus is connected to the negative electrode of the DC input terminal of the switching power supply 50.

A second side of the DC/DC power supply unit 52 serves as the output terminal of the switching power supply 50 and is connected to the master control unit and the additional load.

It should be noted that, on the basis of the above-mentioned structure, there may be various specific structures of the switching power supply 50, two of which are illustrated hereinafter.

Figure 4:
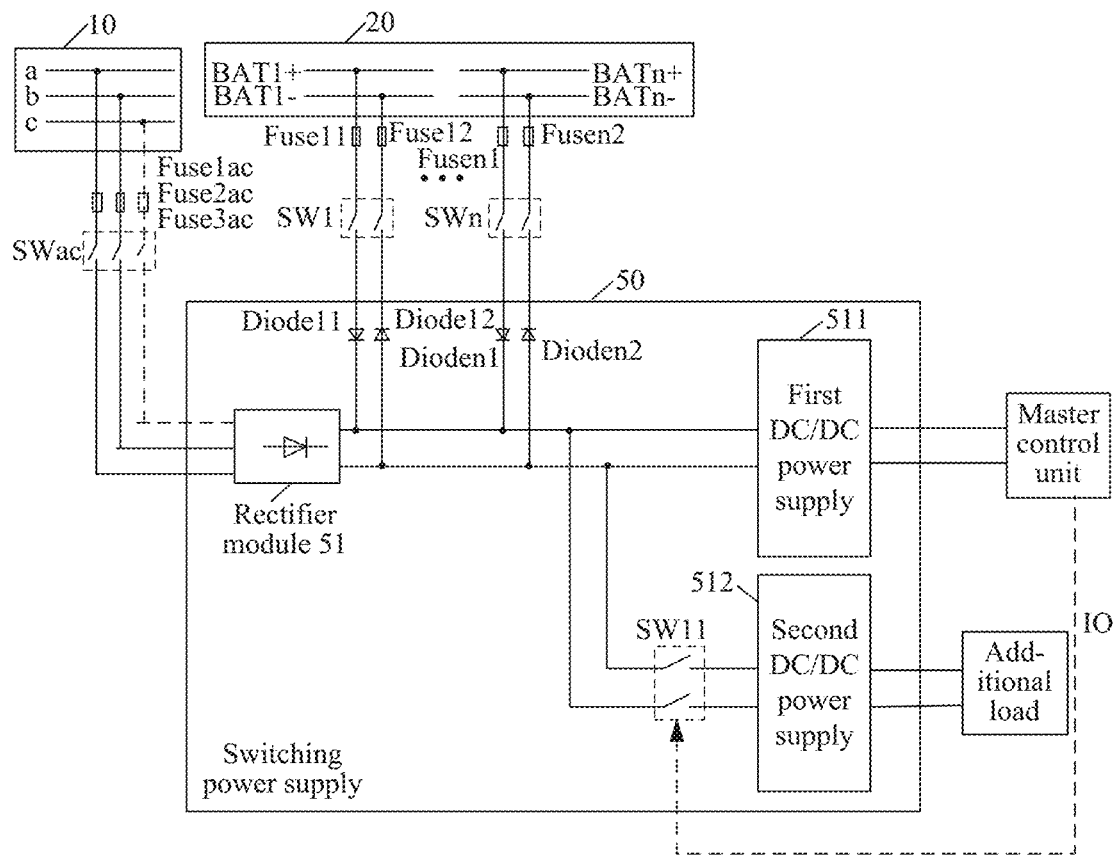
FIG. 4 is a schematic diagram of a switching power supply for an energy storage system according to an embodiment of the present disclosure.

1. A first structure of the switching power supply 50 is as shown in FIG. 3 and FIG. 4, in which the switching power supply 50 has two output terminals. A first output terminal of the switching power supply 50 is connected to the master control unit to supply power to the master control unit, and a second output terminal of the switching power supply 50 is connected to an additional load to supply power to the additional load.

It should be noted that the two output terminals of the switching power supply 50 may each output a voltage of 24V, or may output other voltages. The terminals may have different values of voltage, which depends on an actual situation and is not specifically limited herein, and all shall be within the protection scope of the present disclosure.

In the case where the switching power supply 50 has two output terminals, the power supply to the master control unit and the power supply to the additional load are independent from each other. Therefore, the switching power supply 50 can maintain only the power supply to the master control unit when the energy storage system is in standby. When the energy storage system is in standby, the master control unit may control the switching power supply 50 to stop the power supply to the additional load, and maintain only the power supply to the master control unit. When the energy storage system operates normally, the master control unit may control the switching power supply 50 to resume the power supply to the additional load.

In the case where the switching power supply 50 has two output terminals, there may be various ways to control to stop and resume the power supply to the additional load, and two situations are illustrated below.

(1) A first situation is as shown in FIG. 3, in which the DC/DC power supply unit 52 includes a first DC/DC power supply 511 and a first controllable switching unit SW11.

A first side of the first DC/DC power supply 511 is connected to the DC bus to receive electric energy from the DC bus.

An end on a second side of the first DC/DC power supply 511 serves as the first output terminal of the switching power supply 50 and is connected to the master control unit to supply power to the master control unit.

Another end on the second side of the first DC/DC power supply 511 is connected to the second output terminal of the switching power supply 50 via the first controllable switching unit SW11. The second output terminal of the switching power supply 50 is connected to the additional load to supply power to the additional load. In some embodiments, the another end on the second side of the first DC/DC power supply 511 is connected to an end of the first controllable switching unit SW11, and another end of the first controllable switching unit SW11 serves as the second output terminal of the switching power supply 50 system, and improve a reliability of power supply to the energy storage system.

It is to be noted that, a lead-acid battery equipped in a conventional UPS has a limited capacity. After a power grid is cut off, the UPS has to supply power to all of loads in the energy storage system, so that the energy storage system is generally in standby for only 15 min to 30 min, which is not suitable for an application requiring a long-term standby.

In the embodiments, the switching power supply 50 is further configured to operate in a low-power-consumption standby mode when the energy storage system is in standby, to supply power at most to the master control unit, so as to save the power supply by the switching power supply 50 to the additional load. In this way, a power consumption of the energy storage system during standby is reduced, and thus the standby time of the energy storage system is extended.

In a practical application, in the low-power-consumption standby mode, the switching power supply only maintains the power supply to the master control unit under a control of the master control unit, or stops the power supply to the master control unit and additional load under a control of an external controller. It should be noted that the master control unit has relatively low power consumption, and therefore the switching power supply 50 can maintain the standby state for a long time if supplying power only to the master control unit, which can reduce loss of the switching power supply 50. In addition, directly stopping the power supply to the master control unit and the additional load may further reduce the loss of the switching power supply 50. In other words, the embodiments can reduce the power consumption of the energy storage system during standby, and extend the standby time of the energy storage system.

Figure 1:
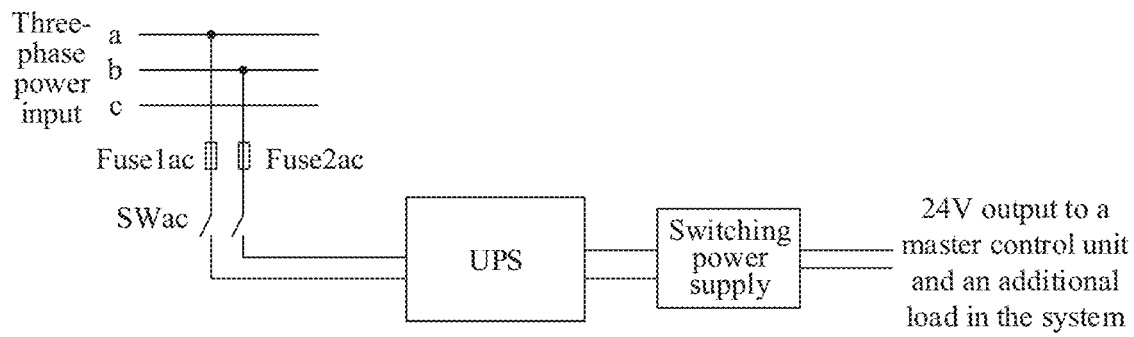
FIG. 1 is a block diagram of a power supply for an energy storage system according to the conventional technology.
Figure 2:
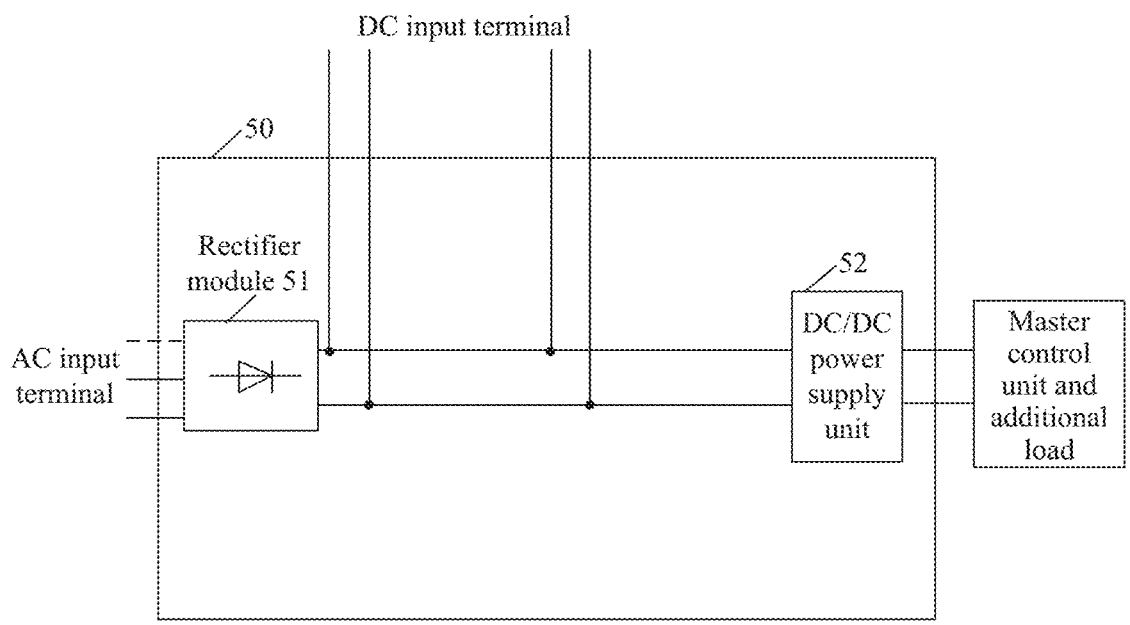
FIG. 2 is a schematic diagram of a switching power supply for an energy storage system according to an embodiment of the present disclosure.

In a practical application, referring to FIG. 2, the switching power supply 50 may include a rectifier module 51 and a DC/DC power supply unit 52.

An AC side of the rectifier module 51 serves as the AC input terminal of the switching power supply 50 and is connected to the AC power source 10 via a protection fuse unit.

In some embodiments, the AC side of the rectifier module 51 is connected to an end of the protection fuse unit, and another end of the protection fuse unit is connected to the AC power source 10. Here, description is made by an example in which the AC power source 10 and is connected to the additional load.

The first controllable switching unit SW11 includes a positive controllable switch and/or a negative controllable switch. The positive controllable switch may be arranged on a positive branch between the second side of the first DC/DC power supply 511 and the second output terminal of the switching power supply 50, and/or the negative controllable switch is arranged on a negative branch between the second side of the first DC/DC power supply 511 and the second output terminal of the switching power supply 50.

The first controllable switching unit SW11 is controlled by the master control unit. The master control unit may control the first controllable switching unit SW11 by an IO signal, that is, the master control unit can control an on/off state of the first controllable switching unit SW11.

In some embodiments, when the energy storage system is in standby, the master control unit controls to turn off the first controllable switching unit SW11 to disconnect the first DC/DC power supply 511 from the additional load, so that the switching power supply 50 stops supplying power to the additional load and maintains only the power supply to the master control unit, entering a low-power-consumption standby mode. In this case, the additional load is cut off, and the power supply loss of the system includes only the power supply loss on the master control unit and the power supply loss on the first DC/DC power supply 511.

When the energy storage system operates normally, the master control unit controls to turn on the first controllable switching unit SW11 to connect the first DC/DC power supply 511 to the additional load, so that the switching power supply 50 starts to supply power to the additional load. In this way, the switching power supply 50 supplies power to both the master control unit and the additional load.

In a case where the first controllable switching unit SW11 includes the positive controllable switch and the negative controllable switch, the controlling to turn off the first controllable switching unit SW11 is performed by controlling to turn off at least one of the positive controllable switch and the negative controllable switch, and the controlling to turn on the first controllable switching unit SW11 is performed by controlling to turn on both the positive controllable switch and the negative controllable switch.

In the structure shown in FIG. 3, the switching power supply 50 has a single DC/DC power supply, and therefore values of output voltage on the two output terminals of the switching power supply 50 are the same. In some embodiments, as shown in FIG. 4, one more DC/DC power supply is added to the switching power supply 50, in order to further reduce the power supply loss during standby. In the structure shown in FIG. 4, the two output terminals of the switching power supply are connected to different DC/DC power supplies, therefore the values of output voltage on the two output terminals may or may not be the same. The values of output voltages are related to the types of the two DC/DC power supplies, which is described below.

(2) A second situation is as shown in FIG. 4, in which the DC/DC power supply unit 52 includes a first controllable switching unit SW11, a first DC/DC power supply 511 and a second DC/DC power supply 512.

A first side of the first DC/DC power supply 511 is connected to the DC bus to receive electric energy from the DC bus.

A first side of the second DC/DC power supply 512 is connected to the DC bus via the first controllable switching unit SW11 to receive electric energy from the DC bus via the first controllable switching unit SW11. In some embodiments, the first side of the second DC/DC power supply is connected to an end of the first controllable switching unit SW11, and another end of the first controllable switching unit SW11 is connected to the DC bus.

The first controllable switching unit SW11 includes a positive controllable switch and/or a negative controllable switch. The positive controllable switch is arranged between a positive electrode on the first side of the second DC/DC power supply 512 and a positive electrode of the DC bus; and/or the negative controllable switch is arranged between a negative electrode on the first side of the second DC/DC power supply 512 and a negative electrode of the DC bus.

A second side of the first DC/DC power supply 511 serves as the first output terminal of the switching power supply 50 and is connected to the master control unit to supply power to the master control unit.

A second side of the second DC/DC power supply 512 serves as the second output terminal of the switching power supply 50 and is connected to the additional load to supply power to the additional load.

The first controllable switching unit SW11 is controlled by the master control unit. The master control unit can control the first controllable switching unit SW11 by an IO signal, that is, the master control unit can control an on/off state of the first controllable switching unit SW11.

In some embodiments, when the energy storage system is in standby, the master control unit controls to turn off the first controllable switching unit SW11 to disconnect the second DC/DC power supply 512 from the DC bus, so that the switching power supply 50 stops supplying power to the additional load and maintains only the power supply to the master control unit, entering a low-power-consumption standby mode. In this case, the additional load is cut off, and the power supply loss of the system includes only the power supply loss on the master control unit and the power supply loss on the first DC/DC power supply 511. When the energy storage system operates normally, the master control unit controls to turn on the first controllable switching unit SW11 to connect the second DC/DC power supply 512 to the DC bus, so that the switching power supply 50 starts to supply power to the additional load. In this case, the switching power supply 50 supplies power to both the master control unit and the additional load.

In a case where the first controllable switching unit SW11 includes the positive controllable switch and the negative controllable switch, the controlling to turn off the first controllable switching unit SW11 is performed by controlling to turn off at least one of the positive controllable switch and the negative controllable switch, and the controlling to turn on the first controllable switching unit SW11 is performed by controlling to turn on both the positive controllable switch and the negative controllable switch.

It should be noted that since the two output terminals of the switching power supply 50 are connected to different DC/DC power supplies, the capacity of each of the DC/DC power supplies may be designed respectively based on the energy consumption of the master control unit and the additional load. The first DC/DC power supply 511 shown in FIG. 4 may be designed to have a small capacity since the power required by the master control unit is small. In this way, compared to the structure in FIG. 3, the switching power supply 50 in FIG. 4 causes lower loss when in the low-power-consumption standby mode.

In the embodiments, the master control unit and the additional load can be separately controlled by adding the first controllable switching unit SW11. When the system enters the standby mode, the additional load is cut off so as to reduce the power supply loss in the system and extend the standby time of the system.

In a practical application, in order to further reduce the loss in the energy storage system during standby, the switching power supply 50 may stop the power supply to both the master control unit and the additional load under a control of an external controller.

2. A second structure of the switching power supply 50 is as shown in FIG. 5, which can stop, when the energy storage system is in standby, the power supply to both the master control unit and the additional load under a control of an external controller.

Figure 5:
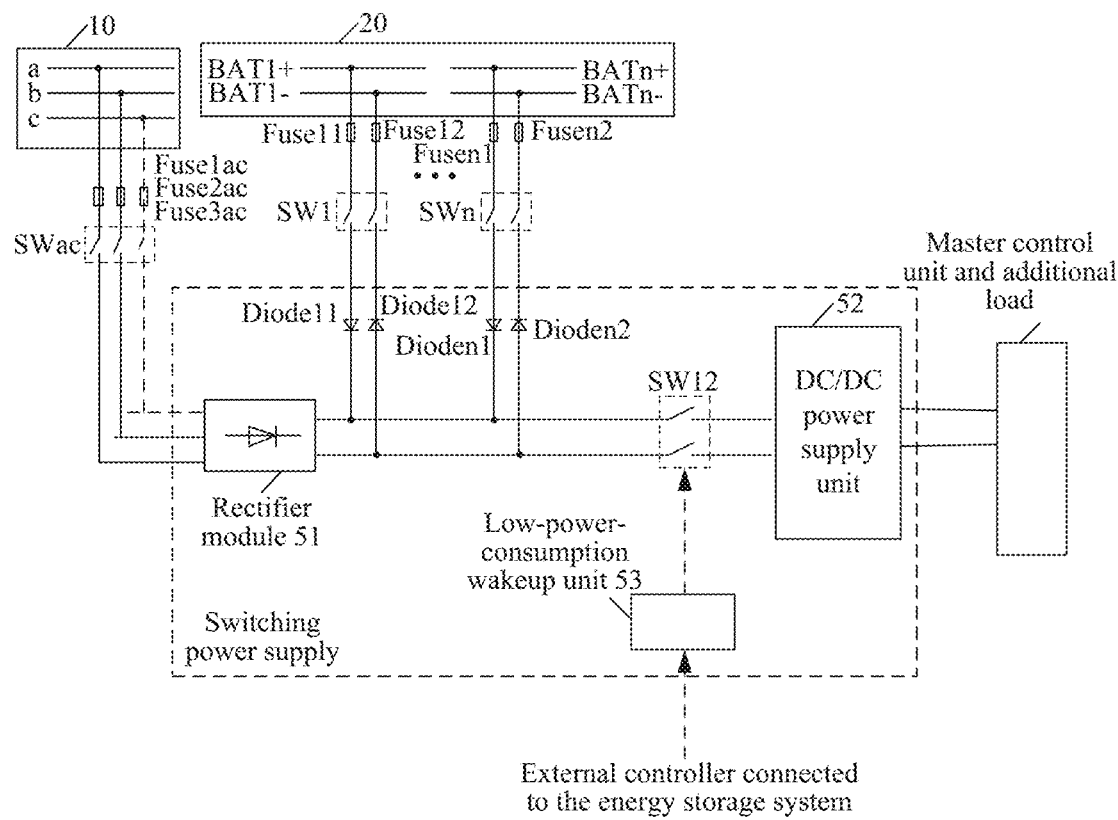
FIG. 5 is a schematic diagram of a switching power supply for an energy storage system according to an embodiment of the present disclosure.

As shown in FIG. 5, the switching power supply 50 further includes a second controllable switching unit SW12 and a low-power-consumption wakeup unit 53.

The second controllable switching unit SW12 is arranged between a first side of a DC/DC power supply unit 52 and the DC bus. In some embodiments, an end of the second controllable switching unit SW12 is connected to a first side of the DC/DC power supply unit 52, and another end of the second controllable switching unit SW12 is connected to the DC bus.

The second controllable switching unit SW12 includes a positive controllable switch and/or a negative controllable switch. The positive controllable switch is arranged between a positive electrode on the first side of the DC/DC power supply unit 52 and a positive electrode on the DC bus, and/or the negative controllable switch is arranged between the negative electrode on the first side of the DC/DC power supply unit 52 and a negative electrode of the DC bus.

An output terminal of the low-power-consumption wakeup unit 53 is connected to a control terminal of the second controllable switching unit SW12. The low-power-consumption wakeup unit 53 is configured to receive a control signal from an external controller and control an on/off state of the second controllable switching unit SW12 in response to the control signal. When the energy storage system is in standby, the lower-power wakeup unit 53 controls to turn off the second controllable switching unit SW12, so as to control the switching power supply 50 to stop supplying power to the master control unit and the additional load.

In some embodiments, when the energy storage system is in standby, a controller outside the energy storage system transmits an instruction to turn off the second controllable switching unit SW12, so that the output from the switching power supply 50 is cut off, and the power supply to both the master control unit and the additional load in the system is cut off. In the standby mode, only the circuit of the low-power-consumption wakeup unit 53 consumes power. In practical applications, the external controller may be a host computer or a mobile device such as a handheld terminal.

In a case where the second controllable switching unit SW12 includes the positive controllable switch and the negative controllable switch, the controlling to turn off the first controllable switching unit SW12 is performed by controlling to turn off at least one of the positive controllable switch and the negative controllable switch, and the controlling to turn on the first controllable switching unit SW12 is performed by controlling to turn on both the positive controllable switch and the negative controllable switch.

In a practical application, the low-power-consumption wakeup unit 53 includes a first voltage dividing and stabilizing branch 531, a second voltage dividing and stabilizing branch 532, a switching unit 535, an optical coupler Q. and a driving unit 534.

A first side of the first voltage dividing and stabilizing branch 531 and a first side of the second voltage dividing and stabilizing branch 532 are both connected to the DC bus. In some embodiments, a positive electrode on the first side of the first voltage dividing and stabilizing branch 531 is connected to a positive electrode of the DC bus, and a negative electrode on the first side of the first voltage dividing and stabilizing branch 531 is connected to a negative electrode of the DC bus. A positive electrode on the first side of the second voltage dividing and stabilizing branch 532 is connected to a positive electrode of the DC bus, and a negative electrode on the first side of the second voltage dividing and stabilizing branch 532 is connected to a negative electrode of the DC bus.

A positive electrode on the second side of the first voltage dividing and stabilizing branch 531 is connected to an end of the switching unit 535. A negative electrode on the second side of the first dividing and stabilizing branch 531 is connected to another end of the switching unit 535 via a light-emitting side of the optical coupler Q. In some embodiments, the negative electrode on the second side of the first voltage dividing and stabilizing branch 531 is connected to an end on the light-emitting side of the optical coupler Q. and another end on the light-emitting side of the optical coupler Q is connected to the another end of the switching unit 535.

A light-receiving side of the optical coupler Q is arranged between two ends on a second side of the second voltage dividing and stabilizing branch 532. In some embodiments, an end on the light-receiving side of the optical coupler Q is connected to a positive electrode on the second side of the second voltage dividing and stabilizing branch 532, and another end on the light-receiving side of the optical coupler Q is connected to a negative electrode on the second side of the second voltage dividing and stabilizing branch 532.

A first side of the driving unit 534 is connected to both ends on the light-receiving side of the optical coupler Q. In some embodiments, a positive electrode on the first side of the driving unit 534 is connected to an end on the light-receiving side of the optical coupler Q and the positive electrode on the second side of the second voltage dividing and stabilizing branch 532; and a negative electrode on the first side of the driving unit 534 is connected to the another end on the light-receiving side of the optical coupler Q.

A second side of the driving unit 534 is configured to drive the second controllable switching unit SW12.

When the energy storage system enters the standby state, the switching unit 535 is turned on, current flows through the first voltage dividing and stabilizing branch 531, the light-emitting side of the optical coupler Q emits light, and the light-receiving side of the optical coupler Q is turned on, so that the driving unit 534 receives a signal to control to turn off the second controllable switching unit SW12.

Figure 6:
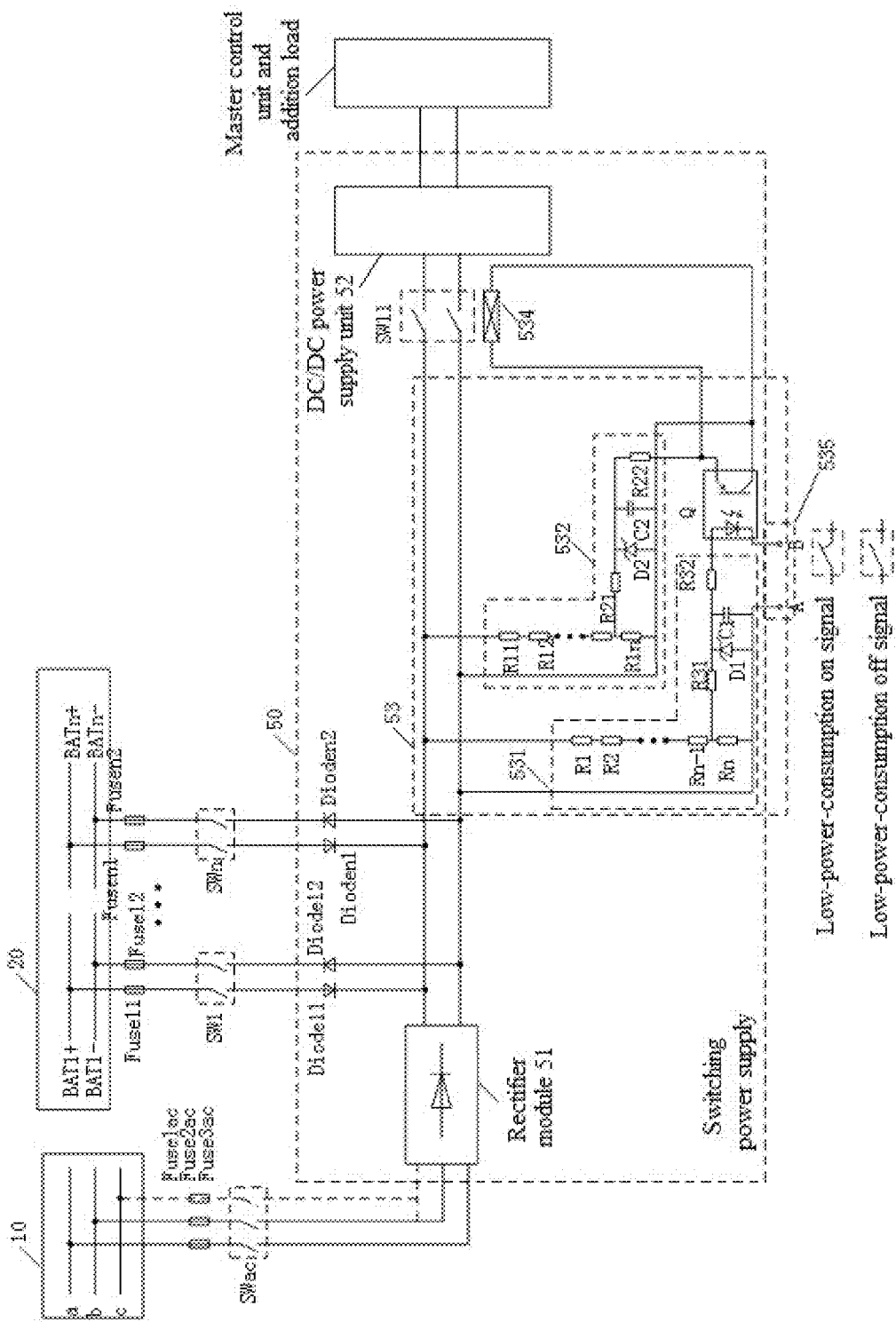
FIG. 6 is a schematic diagram of a switching power supply for an energy storage system according to an embodiment of the present disclosure.

In a practical application, the first voltage dividing and stabilizing branch 531 includes a first resistor (including R1, R2, ..., and Rn−1 as shown in FIG. 6), a second resistor Rn, a third resistor R31, a fourth resistor R32, a first voltage stabilizing diode D1, and a first capacitor C1.

In some embodiments, an end of the first resistor is connected to a positive electrode of the DC bus. Another end of the first resistor is connected to an end of the second resistor Rn and an end of the third resistor R31. Another end of the third resistor R31 is connected to a cathode of the first voltage stabilizing diode D1, an end of the fourth resistor R34, and an end of the first capacitor C1. Another end of the fourth resistor R34 serves as the negative electrode on the second side of the first voltage dividing and stabilizing branch 531. A negative electrode of the DC bus, another end of the second resistor Rn, an anode of the first voltage stabilizing diode D1, and another end of the first capacitor C1 are connected at a point serving as the positive electrode on the second side of the first voltage dividing and stabilizing branch 531.

The first resistor may include multiple sub-resistors connected in series, or may include a single resistor, which depends on an actual situation and is not specifically limited herein, and all shall be within the protection scope of the present disclosure.

The second voltage dividing and stabilizing branch 532 includes a fifth resistor (including R11, R12, ... as shown in FIG. 6), a sixth resistor R1n, a seventh resistor R21, an eighth resistor R22, a second voltage stabilizing diode D2, and a second capacitor C2.

In some embodiments, an end of the fifth resistor is connected to a positive electrode of the DC bus. Another end of the fifth resistor is connected to an end of the sixth resistor R1n and an end of the seventh resistor R21. Another end of the seventh resistor R21 is connected to a cathode of the second voltage stabilizing diode D2, an end of the eighth resistor R22, and an end of the second capacitor C2. Another end of the eighth resistor R22 serves as the positive electrode on the second side of the second voltage dividing and stabilizing branch 532. A negative electrode of the DC bus, another end on the first side of the driving unit 534, another end of the sixth resistor R1n, an anode of the second voltage stabilizing diode D2, and another end of the second capacitor C2 are connected at a point serving as the negative electrode on the second side of the second voltage dividing and stabilizing branch 532.

The fifth resistor may include multiple sub-resistors connected in series, or may include a single resistor, which depends on an actual situation and is not specifically limited herein, and all shall be within the protection scope of the present disclosure.

As shown in FIG. 6, when the energy storage system enters the standby mode, an external controller of the energy storage system inputs a low-power-consumption on signal to point A and point B, and the low-power-consumption wakeup unit 53 controls to turn off the second controllable switching unit SW12. In this case, only the circuit of the low-power-consumption wakeup unit 53 consumes power. When the system needs to enter an operating mode, the external controller inputs a low-power-consumption off signal to point A and point B, and the low-power-consumption wakeup unit 53 controls to turn on the second controllable switching unit SW12. In this case, the switching power supply 50 operates to supply power to all loads in the system. The low-power-consumption on signal may be implemented as establishing a connection between point A and point B, and the low-power-consumption off signal may be implemented as breaking the connection between point A and point B.

In the embodiments, the use of the low-power-consumption wakeup unit 53 may further reduce the loss of the switching power supply 50 when the system is in standby, and extend the standby time of the system.

In some embodiments, the DC bus may be connected to one or more battery clusters in the energy storage unit 20 via one or more DC input terminals of the switching power supply 50. In other words, the DC bus may be connected to a single battery cluster or multiple battery clusters.

In a practical application, the switching power supply 50 further includes N diode transmission modules (such as the module formed by Diode11 and Diode12, or the module formed by Dioden1 and Dioden2 as shown in FIG. 3 to FIG. 6), and the number N of the diode transmission modules is equal to the number of the battery clusters connected to the DC bus via the DC input terminals.

The battery clusters are each connected in serial to a diode transmission module and then connected in parallel to the DC bus, so that at any time only one of the batter clusters who has the highest voltage outputs power.

Figure 7:
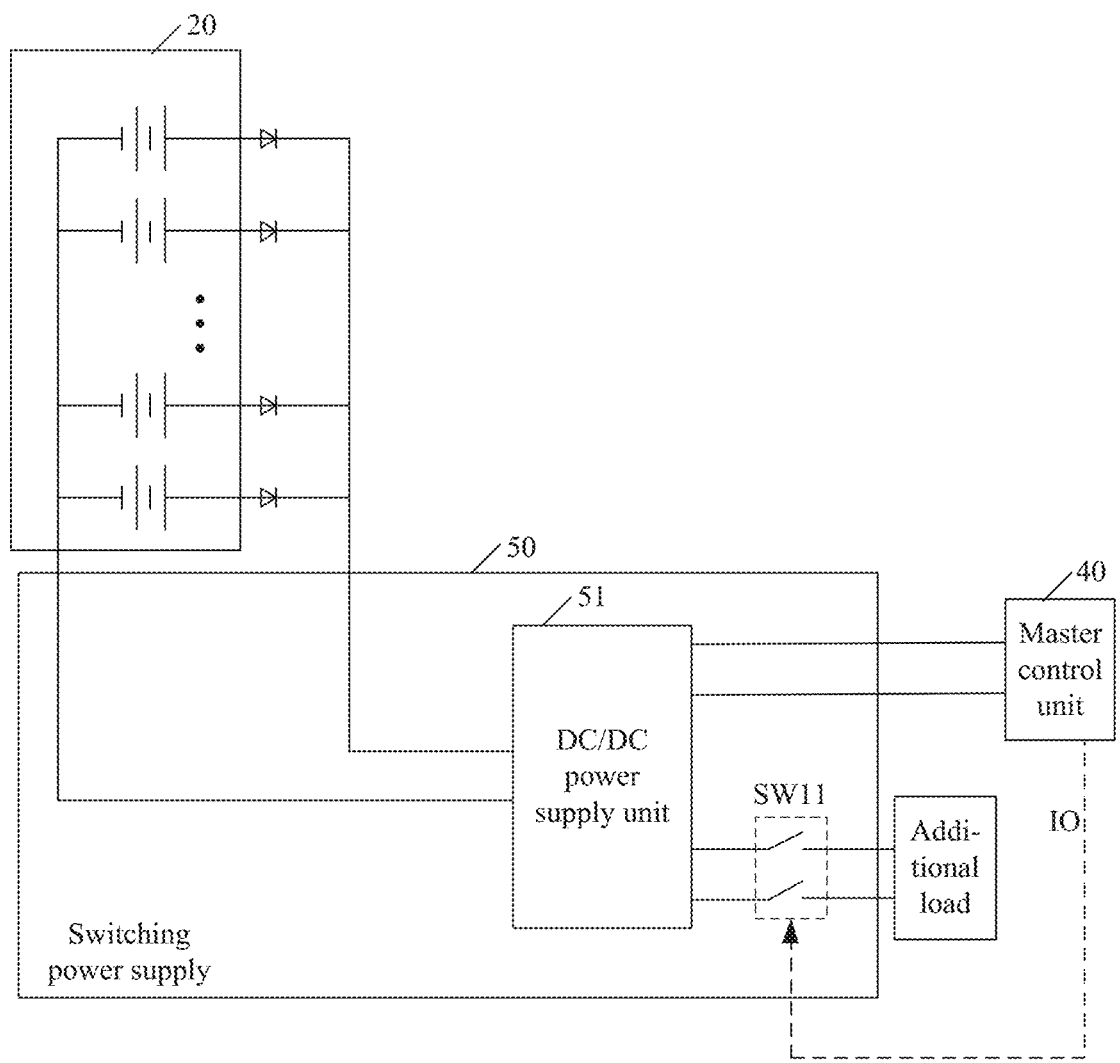
FIG. 7 is a schematic diagram of a switching power supply for an energy storage system according to an embodiment of the present disclosure.

As shown in FIG. 7, each diode transmission module may include a diode connected in series with a battery cluster. When N is greater than 1, the battery clusters are connected in parallel to the DC bus via corresponding diodes. In an example of a single battery cluster, an positive electrode of the battery cluster (such as BAT1+, . . . , or BATn+ as shown in FIG. 3 to FIG. 6) is connected to an anode of the diode, and a negative electrode of the battery cluster (such as BAT1−, . . . , or BATn− as shown in FIG. 3 to FIG. 6) is connected to a negative electrode of the DC bus, and a cathode of the diode is connected to a positive electrode of the DC bus. Alternatively, the negative electrode of the battery cluster is connected to the cathode of the diode, the positive electrode of the battery cluster is connected to the positive electrode of the DC bus, and the anode of the diode is connected to the negative electrode of the DC bus. FIG. 7 shows only an example, and does not show the rectifier module 51 and the connection thereof.

As shown in FIG. 3 to FIG. 6, the diode transmission module may include two diodes (such as Diode11 and Diode12, or Dioden1 and Dioden2, as shown in FIG. 3 to FIG. 6), which are arranged on a positive electrode and a negative electrode of a battery cluster, respectively. When N is greater than 1, the battery clusters are connected in parallel to the DC bus via corresponding diodes. In an example of a single battery cluster, a positive electrode BAT1+ of the battery cluster is connected to an anode of a first diode Diode1, a cathode of the first diode Diode1 is connected to a positive electrode of the DC bus, a negative electrode BAT1− of the battery cluster is connected to a cathode of a second diode Diode2, and an anode of the second diode Diode2 is connected to a negative electrode of the DC bus.

The switching power supply 50 may receive electric energy from multiple battery clusters. The battery clusters are each connected in serial to a diode and then connected in parallel to each other. Therefore, at any time only one of the multiple independent battery clusters, who has the highest voltage, provides electric energy, which avoids an unbalanced SOC among battery clusters due to receiving electric energy from a single battery cluster, and thereby improves reliability of power supply in the energy storage system. In addition, when the energy storage system is in standby or normal operation, i.e., when the switching power supply 50 is working and consuming power, the battery cluster with the highest voltage is automatically selected to provide electric energy for consumption by the energy storage system, which realizes SOC balance among battery clusters. That is, the switching power supply 50 can realize SOC balance of battery clusters while achieving low power consumption during standby.

In the embodiments, since the energy storage unit 20 contains a large-capacity battery cluster, the standby time of the system can be significantly increased by using the battery cluster in the energy storage unit 20 to supply power. In addition, the standby time of the system is further increased by receiving electric energy from multiple battery clusters. Moreover, the reliability of power supply in the system is improved since the battery cluster and the AC power source 10 are backups for each other.

An energy storage system is further provided according to an embodiment of the present disclosure. Referring to FIG. 8, the energy storage system includes an energy storage unit 20, a master control unit 40, a power converter 30, and the switching power supply 50 according to any one of the foregoing embodiments. Specific structure and working principle of the switching power supply 50 are described above, and is not repeated herein, and all shall be within the protection scope of the present disclosure.

The energy storage unit 20 is connected to an external device via the power converter 30. In other words, an output terminal of the energy storage unit 20 is connected to a side of the power converter 30, and another side of the power converter 30 is connected to an external device.

The energy storage unit 20 and the power converter 30 are both communicatively connected to the master control unit 40. In other words, the master control unit 40 can interact with the energy storage unit 20, and control a working state of the power converter 30.

The switching power supply 50 is configured to provide auxiliary power supply to, for example, the master control unit 40 and the power converter 30.

In a practical application, the energy storage unit 20 includes one or more battery clusters.

The battery clusters are connected in parallel to a side of the power converter 30, and another side of the power converter 30 is connected to an external device. In some embodiments, the battery clusters are connected in parallel to each other and then connected to the side of the power converter 30.

In a case where the external device is a transformer connected to a power grid, the power converter 30 is a power conversion system PCS. In some embodiments, a DC side of the PCS is connected to the energy storage unit 20, and an AC side of the PCS is connected to a transformer in the power grid.

In a case where the external device is a photovoltaic grid-connected system, the power converter 30 is a bidirectional DC/DC converter connected to a DC bus of an inverter in the photovoltaic grid-connected system. In some embodiments, a side of the bidirectional DC/DC converter is connected to the energy storage unit 20, and another side of the bidirectional DC/DC converter is connected to the DC bus of the inverter.

In a practical application, a manual switching unit (such as SWac as shown in FIG. 8) is provided between the AC input terminal of the switching power supply 50 and a protection fuse unit, and is configured to control an on/off state between the switching power supply 50 and the AC power source 10.

Another manual switching unit (such as SW1 or SWn as shown in FIG. 8) is provided between the DC input terminal of the switching power supply 50 and a protection fuse unit, and is configured to control an on/off state between the switching power supply 50 and the energy storage unit 20.

The features cited in embodiments of the present disclosure may be replaced or combined with each other, the same or similar parts among the embodiments may be referred to each other, and each embodiment places emphasis on the difference from another embodiment. Since the system disclosed in the embodiments is basically similar to the method, the description thereof is relatively simple, and reference may be made to the description of the method for relevant matters. The above-described system and the embodiments of the system are only schematic. A units described as discrete components may or may not be physically separated. Components shown as units may or may not be physical units, that is, the components may be located in a same place or may be distributed onto multiple network units. Some or all modules thereof may be selected based on an actual requirement, to implement an objective of the solution in the embodiments. Those skilled in the art may understand and implement the present disclosure without any creative effort.

It may be further understood by those skilled in the art that units and algorithm steps described in combination with the disclosed embodiments may be implemented by electronic hardware, computer software or a combination thereof. In order to clearly describe interchangeability of the hardware and the software, the units and the steps are generally described above in view of their functions. Whether the functions being implemented by the hardware or by the software depends on applications of the technical solution and design constraint conditions. Those skilled in the art may use different methods for each particular application to implement the described functions, but such implementation should not be considered as going beyond the scope of the present disclosure.

The description of the embodiments herein enables those skilled in the art to implement or use the present disclosure. Many modifications to these embodiments are apparent for those skilled in the art. The general principles defined herein may be applied to other embodiments without departing from the spirit or scope of the present disclosure. Therefore, the present disclosure is not limited to the embodiments illustrated herein, but is to conform to the widest scope consistent with the principles and novel features disclosed herein.

The invention claimed is:

1. A switching power supply for an energy storage system, wherein
    an alternating current, AC, input terminal of the switching power supply is connected to an AC power source via a first protection fuse unit;
    a direct current, DC, input terminal of the switching power supply is connected to an energy storage unit in the energy storage system via a second protection fuse unit;
    an output terminal of the switching power supply is connected to a power supply terminal of a master control unit in the energy storage system and a power supply terminal of an additional load in the energy storage system; and
    the switching power supply is configured to: receive electric energy from at least one of the energy storage unit and the AC power source, and supply power to the master control unit and the additional load in the energy storage system; and switch, when the energy storage system enters a standby state, to a low-power-consumption standby mode to supply power at most to the master control unit.

2. The switching power supply for the energy storage system according to claim 1, wherein in the low-power-consumption standby mode, the switching power supply is configured to supply power only to the master control unit under a control of the master control unit, or stop supplying power to both the master control unit and the additional load under a control of an external controller.

3. The switching power supply for the energy storage system according to claim 1, wherein the switching power supply comprises a rectifier module and a DC/DC power supply unit, wherein
    an AC side of the rectifier module serves as the AC input terminal of the switching power supply;
    a DC side of the rectifier module is connected to a first side of the DC/DC power supply unit via a DC bus;
    the DC bus is further connected to the DC input terminal of the switching power supply; and
    a second side of the DC/DC power supply unit serves as the output terminal of the switching power supply.

4. The switching power supply for the energy storage system according to claim 3, wherein the DC bus is connected to one or more battery clusters in the energy storage unit via one or more DC input terminals of the switching power supply.

5. The switching power supply for the energy storage system according to claim 4, further comprising one or more diode transmission modules, wherein
    a number N of the diode transmission modules is equal to a number of the battery clusters connected to the DC bus via the one or more DC input terminals, and
    the battery clusters are each connected in serial to one of the diode transmission modules, and then connected in parallel to the DC bus, so that at any time only one of the battery clusters, which has highest voltage, outputs power.

6. The switching power supply for the energy storage system according to claim 3, wherein the output terminal of the switching power supply comprises:
    a first output terminal for supplying power to the master control unit; and
    a second output terminal for supplying power to the additional load.

7. The switching power supply for the energy storage system according to claim 6, wherein the DC/DC power supply unit comprises a first DC/DC power supply and a first controllable switching unit, wherein a first side of the first DC/DC power supply is connected to the DC bus;

an end on a second side of the first DC/DC power supply serves as the first output terminal of the switching power supply; and another end on the second side of the first DC/DC power supply is connected to the second output terminal of the switching power supply via the first controllable switching unit.

8. The switching power supply for the energy storage system according to claim 7, wherein the first controllable switching unit is controlled by the master control unit.

9. The switching power supply for the energy storage system according to claim 6, wherein the DC/DC power supply unit comprises a first controllable switching unit, a first DC/DC power supply, and a second DC/DC power supply, wherein a first side of the first DC/DC power supply is connected to the DC bus;

a first side of the second DC/DC power supply is connected to the DC bus via the first controllable switching unit;

a second side of the first DC/DC power supply serves as the first output terminal of the switching power supply; and a second side of the second DC/DC power supply serves as the second output terminal of the switching power supply.

10. The switching power supply for the energy storage system according to claim 9, wherein the first controllable switching unit is controlled by the master control unit.

11. The switching power supply for the energy storage system according to claim 3, wherein the switching power supply further comprises a second controllable switching unit and a low-power-consumption wakeup unit;

the second controllable switching unit is arranged between the first side of the DC/DC power supply unit and the DC bus; and the low-power-consumption wakeup unit is configured to receive a control signal from an external controller, and control an on/off state of the second controllable switching unit in response to the control signal, to turn off the second controllable switching unit when the energy storage system enters the standby state.

12. The switching power supply for the energy storage system according to claim 11, wherein the low-power-consumption wakeup unit comprises a first voltage dividing and stabilizing branch, a second voltage dividing and stabilizing branch, a switching unit, an optical coupler, and a driving unit, wherein a first side of the first voltage dividing and stabilizing branch and a first side of the second voltage dividing and stabilizing branch are both connected to the DC bus;

a positive electrode on a second side of the first voltage dividing and stabilizing branch is connected to an end of the switching unit;

a negative electrode on the second side of the first voltage dividing and stabilizing branch is connected to another end of the switching unit via a light-emitting side of the optical coupler;

the switching unit is turned on when the energy storage system enters the standby state;

a light-receiving side of the optical coupler is arranged between two ends of a second side of the second voltage dividing and stabilizing branch;

a first side of the driving unit is connected to both ends on the light-receiving side of the optical coupler; and a second side of the driving unit is configured to drive the second controllable switching unit.

13. The switching power supply for the energy storage system according to claim 12, wherein the first voltage dividing and stabilizing branch comprises: a first resistor, a second resistor, a third resistor, a fourth resistor, a first voltage stabilizing diode, and a first capacitor, wherein an end of the first resistor is connected to a positive electrode of the DC bus;

another end of the first resistor is connected to an end of the second resistor and an end of the third resistor;

another end of the third resistor is connected to a cathode of the first voltage stabilizing diode, an end of the fourth resistor, and an end of the first capacitor;

another end of the fourth resistor serves as the negative electrode on the second side of the first voltage dividing and stabilizing branch; and a negative electrode of the DC bus, another end of the second resistor, an anode of the first voltage stabilizing diode, and another end of the first capacitor are connected at a point serving as the positive electrode on the second side of the first voltage dividing and stabilizing branch.

14. The switching power supply for the energy storage system according to claim 12, wherein the second voltage dividing and stabilizing branch comprises a fifth resistor, a sixth resistor, a seventh resistor, an eighth resistor, and a second voltage stabilizing diode, and a second capacitor, wherein an end of the fifth resistor is connected to a positive electrode of the DC bus;

another end of the fifth resistor is connected to an end of the sixth resistor and an end of the seventh resistor;

another end of the seventh resistor is connected to a cathode of the second voltage stabilizing diode, an end of the eighth resistor, and an end of the second capacitor;

another end of the eighth resistor serves as the positive electrode on the second side of the second voltage dividing and stabilizing branch; and a negative electrode of the DC bus, an end on the first side of the driving unit, another end of the sixth resistor, an anode of the second voltage stabilizing diode, and another end of the second capacitor are connected at a point serving as the negative electrode on the second side of the second voltage dividing and stabilizing branch.

15. An energy storage system, comprising:

an energy storage unit, a master control unit, a power converter, and a switching power supply, wherein an alternating current, AC, input terminal of the switching power supply is connected to an AC power source via a first protection fuse unit;

a direct current, DC, input terminal of the switching power supply is connected to the energy storage unit in the energy storage system via a second protection fuse unit;

an output terminal of the switching power supply is connected to a power supply terminal of the master control unit in the energy storage system and a power supply terminal of an additional load in the energy storage system; and the switching power supply is configured to: receive electric energy from at least one of the energy storage unit and the AC power source, and supply power to the master control unit and the additional load in the energy storage system; and switch, when the energy storage system enters a standby state, to a low-power-consumption standby mode to supply power at most to the master control unit, the energy storage unit is connected to an external device via the power converter;

the energy storage unit and the power converter are both communicatively connected to the master control unit; and the switching power supply is configured to provide auxiliary power supply.

16. The energy storage system according to claim 15, wherein the energy storage unit comprises one or more battery clusters, and wherein the battery clusters are connected in parallel to a side of the power converter, and another side of the power converter is connected to the external device.

17. The energy storage system according to claim 15, wherein in a case where the external device is a transformer connected to a power grid, the power converter is a power conversion system, PCS; and in a case where the external device is a photovoltaic grid-connected system, the power converter is a bidirectional DC/DC converter connected to a DC bus of an inverter in the photovoltaic grid-connected system.

18. The energy storage system according to claim 15, wherein a first manual switching unit is provided between the switching power supply and the first protection fuse unit, and is configured to control an on/off state between the switching power supply and the AC power source, and a second manual switching unit is provided between the switching power supply and the second protection fuse unit, and is configured to control an on/off state between the switching power supply and the energy storage unit.

* * * * *